(No Model.)

E. RUUD.
STUFFING BOX.

No. 433,824. Patented Aug. 5, 1890.

WITNESSES:
R. H. Whittlesey
F. E. Gaither

INVENTOR,
Edwin Ruud,
by Snowden Bell, Att'y.

UNITED STATES PATENT OFFICE.

EDWIN RUUD, OF PITTSBURG, PENNSYLVANIA, ASSIGNOR TO THE FUEL GAS AND MANUFACTURING COMPANY, OF SAME PLACE.

STUFFING-BOX.

SPECIFICATION forming part of Letters Patent No. 433,824, dated August 5, 1890.

Application filed June 19, 1890. Serial No. 355,933. (No model.)

*To all whom it may concern:*

Be it known that I, EDWIN RUUD, a citizen of the United States, residing at Pittsburg, in the county of Allegheny and State of Pennsylvania, have invented or discovered a certain new and useful Improvement in Stuffing-Boxes, of which improvement the following is a specification.

The object of my invention is to provide simple and effective means for preventing leakage of fluid at the joint between a stem or shaft having circumferential movement about its axial line and a plate or partition through which the shaft passes, without involving greater friction between the surfaces in contact than is indispensable to the formation of a tight joint.

To this end my invention, generally stated, consists in the combination, with a shaft adapted to receive axial movement, of oppositely-inclined conical bearing-faces connected to the shaft, a fixed socket abutting against one of said faces, and a flexible diaphragm carrying a socket abutting against the other face.

The improvement claimed is hereinafter fully set forth.

Figure 1:
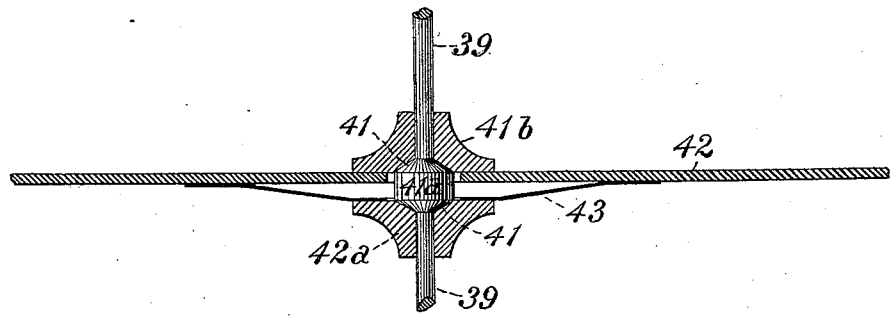
Figure 2:
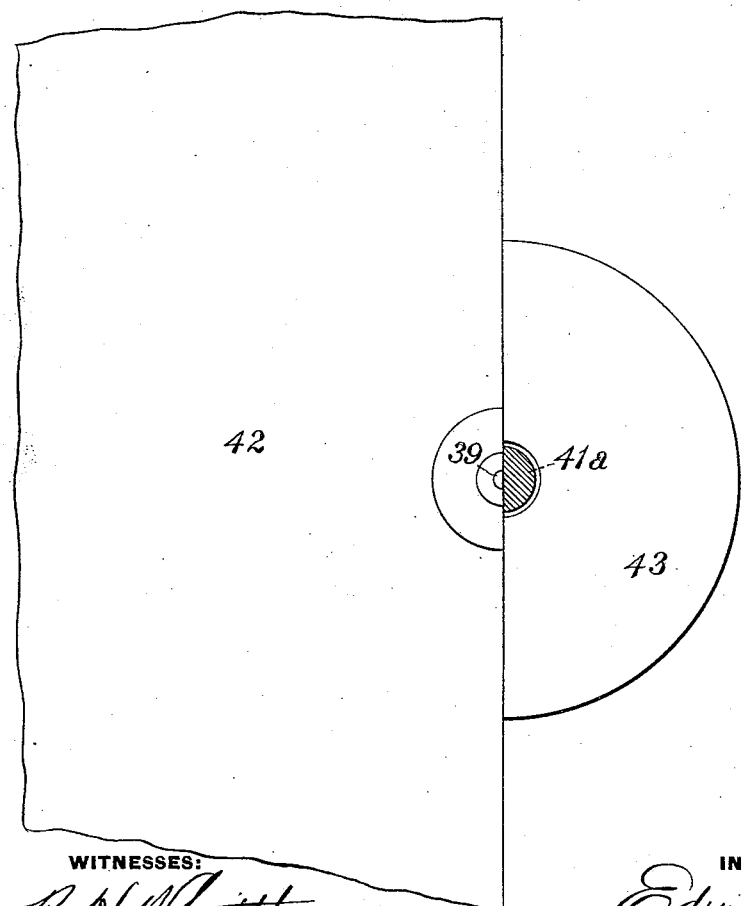

In the accompanying drawings, Figure 1 is a longitudinal central section through a stuffing-box embodying my invention, and Fig. 2 a view half in plan and half in transverse section of the same.

My invention is more particularly designed for application to shafts by which the registering mechanism of fluid-meters is actuated, and is illustrated as so applied, but without being claimed, in a separate application filed by me of even date herewith. It is necessary to the accurate operation of meters that these shafts should rotate with the least practicable degree of friction, and also that leakage of fluid from the meter-casing into the chamber or compartment containing the registering mechanism should be prevented, as such leakage not only involves waste of fluid and inaccuracy of measurement, but also in frequent instances causes the rapid deterioration and destruction of the working parts of the registering mechanism. My improvement enables these requirements to be fully complied with, and is further equally applicable in other constructions where a shaft having a movement of complete or partial rotation is required to be made fluid-tight without undue friction in the opening of a fixed division wall or plate through which it passes.

In the practice of my invention I form or fix upon a shaft 39, which passes through and is adapted to rotate freely in a plate 42, acting as a partition between two adjacent inclosed chambers or compartments, two bearing-faces 41, each of which has the form of a frustum of a cone, the inclination of the two faces being respectively in opposite directions. In the instance illustrated the bearing-faces 41 are formed upon the opposite ends of a collar $41^a$, which is formed or fixed upon the shaft; but, if preferred, the bearing-faces may be formed upon independent disks or plates fixed to the shaft. The shaft rotates freely in a concentric socket $41^b$, secured to the plate 42, said socket having a face corresponding accurately to the adjacent bearing-face 41 of the shaft, and the opposite bearing-face 41 abuts against a corresponding face in a socket $42^a$, which is also concentric with the shaft 39, and is fixed to a flexible diaphragm 43, secured peripherally and with a fluid-tight joint to the plate 42 on the side opposite that to which the socket $41^b$ is fixed. The diaphragm 43 is bent so as to impose a slight pressure upon the connected socket $42^a$, such pressure maintaining the bearing-faces 41 in contact with the abutting faces of their respective sockets with sufficient tightness to prevent leakage, but without imposing more than a comparatively slight degree of friction. The space between the plate 42 and diaphragm 43 serves as a lubricating-chamber, and is preferably filled with oil or other suitable lubricant, which is continuously applied to the contact-surfaces. In cases where fluid-pressure acts upon the flexible diaphragm 43, as in meters, such pressure tends to maintain the bearing-surfaces in proper contact, supplementing the tension of the diaphragm, which is then made of correspondingly less degree. If desired, the requisite tension may be imparted to the diaphragm 43 by a light spring bearing against the same. It will be obvious that the conical form of the bearing-faces and sockets shown is not essential, and that the same may, if preferred, be made in the form of segments of spheres with substantially the same essentials of structure and operative principle and result.

I claim as my invention and desire to secure by Letters Patent—

1. The combination of a stem or shaft, two oppositely-inclined conical bearing-faces fixed thereon, a fixed socket abutting against one of said faces, and a socket connected to a flexible diaphragm and abutting against the other face, substantially as set forth.

2. The combination of a stem or shaft, a fixed plate through which said shaft passes freely, a flexible diaphragm secured peripherally to said plate, two oppositely-inclined conical bearing-faces fixed upon the shaft, and corresponding sockets secured, respectively, upon the fixed plate and diaphragm, and abutting against the shaft bearing-faces, substantially as set forth.

3. The combination of a stem or shaft, a fixed plate through which said shaft passes freely, a flexible diaphragm secured peripherally to said plate and separated centrally therefrom as to form an interposed lubricating-chamber, oppositely-inclined conical bearing-faces fixed upon the shaft, and corresponding sockets secured upon the fixed plate and diaphragm, substantially as set forth.

In testimony whereof I have hereunto set my hand.

EDWIN RUUD.

Witnesses:
J. SNOWDEN BELL,
R. H. WHITTLESEY.